United States Patent [19]
Zorb et al.

[11] Patent Number: 4,516,794
[45] Date of Patent: May 14, 1985

[54] METER PIT MOUNTED HOLDER FOR A WATER FLOW CONTROL DEVICE

[75] Inventors: Larry D. Zorb; L. Harvey Wicklund, both of Bigfork, Mont.

[73] Assignee: Zorwick Corp., Bigfork, Mont.

[21] Appl. No.: 439,353

[22] Filed: Nov. 5, 1982

[51] Int. Cl.³ .............................................. F16L 55/00
[52] U.S. Cl. .................................... 285/30; 285/315; 285/DIG. 11; 285/DIG. 19; 73/201
[58] Field of Search .................... 285/30, 31, 325, 61, 285/315, DIG. 19, DIG. 11; 73/201

[56] References Cited
U.S. PATENT DOCUMENTS

| | | | |
|---|---|---|---|
| 974,651 | 11/1910 | Ford | 285/30 X |
| 978,384 | 12/1910 | Lofton | 285/30 X |
| 4,368,904 | 1/1983 | Lanz | 285/423 |

Primary Examiner—Richard J. Scanlan, Jr.
Attorney, Agent, or Firm—Wells, St. John & Roberts

[57] ABSTRACT

A holder releasably mounts a water flow control device to a water supply line to enable installation and removal of the device from a meter "pit". The holder includes a clamping linkage that can be selectively operated from above ground to release or clamp the device in position between saddle members of the holder relative to the water line. Gasket sleeves are mountable over pipe connectors of the water control device and are releasably received in saddle members of the holder. The sleeves are removable with the flow control device.

10 Claims, 6 Drawing Figures

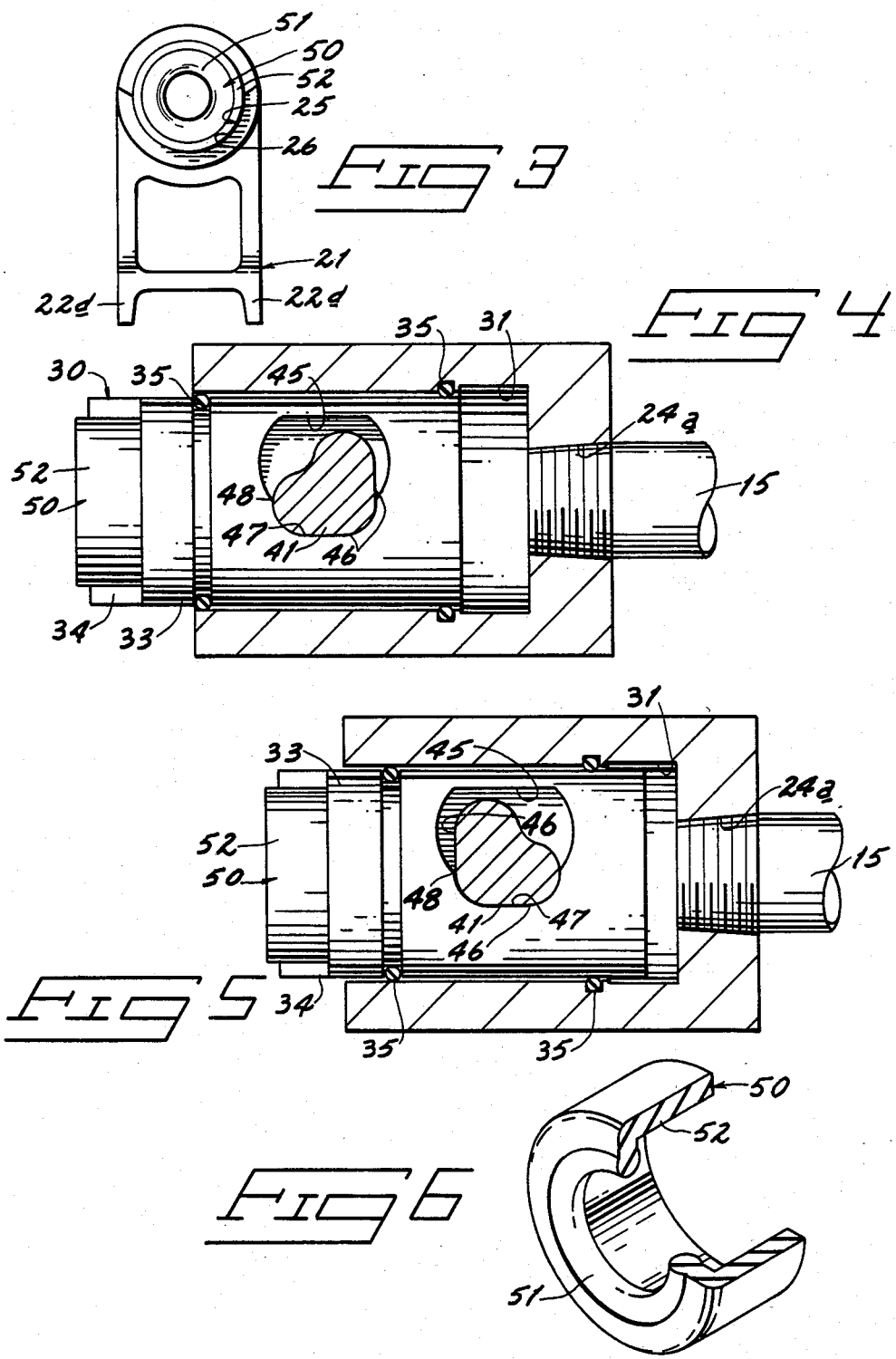

METER PIT MOUNTED HOLDER FOR A WATER FLOW CONTROL DEVICE

FIELD OF THE INVENTION

The present invention is relative to releasably securing water flow control devices such as gauging (water meters), valving, pressure control devices, etc. of the type typically situated underground within a manhole or meter pit at residential and commercial properties.

BACKGROUND OF THE INVENTION

Public or private water utilities often charge customers by the amount of water in gallons they use over prescribed periods of time. The water flow rate is gauged by flow meters that are often found in outside installations at the bottom of excavated "meter pits". The pit depth is determined by the ground frost line in the particular geographic area, but is usually at least $2\frac{1}{2}$ feet deep. Colder areas will naturally require a depth to the water delivery pipes and meter corresponding to the frost line in order to avoid freezing in winter.

Economics dictate that water meters and other associated flow control equipment used in meter pits be periodically checked and recalibrated to assure they are properly operating. To this end, a crew is typically sent out to remove the meters or such other equipment from the meter pits for testing. Deep meter pits must therefore be made large enough for a person to climb down into. They must also be of sufficient diameter to allow the worker access to the enclosed meter with conventional tools. Removal and replacement of equipment from meter pits is not only time consuming but can also be a dangerous job.

An attempted solution to the above problems is noted in U.S. Pat. No. 4,305,282 to Hunt. The Hunt patent discloses a pit mounted meter that can be elevated to the ground surface for removal, replacement, or repair. Flexible lengths of coiled pipe are positioned below the meter in the pit. The coil lengths are sufficient to allow the meter to be lifted to the ground surface. However, a much deeper excavation must be made to store the coiled pipe if the meter is to be located below the frost line. The cost of additional excavation may nearly offset the cost of a larger diameter excavation needed for access to meters mounted directly to the water pipe. Furthermore, the convenience of "above pit" mounting and removal of water meters is offset by the expensive coiled pipe and accompanying hardware for supporting the meter above the pit floor. Additionally, the ground at the pit floor, which is typically warmer than the ambient air, cannot be used by the Hunt device to absorb heat and avoid freezing.

The need therefore remains for an inexpensive holder that will allow meter mounting at the floor of a minimum depth and diameter pit, along with the advantages of above ground installation and removal of the meter.

BRIEF DESCRIPTION OF THE DRAWINGS

A preferred form of the present invention is illustrated in the accompanying drawings in which:

FIG. 3 is a sectional view taken along line 3—3 in FIG. 2.

FIG. 4 is a fragmented sectional view of a sliding saddle and cam mechanism in an operative condition;

FIG. 5 is a view similar to FIG. 4 only showing the elements in an inoperative condition; and FIG. 6 is a pictorial view of a gasket sleeve for the present invention.

DETAILED DESCRIPTION OF THE DRAWINGS

In compliance with the constitutional purpose of the Patent Laws "to promote the progress of science and useful arts" (Article 1, Section 8), applicant submits the following disclosure of the invention.

Figure 1:
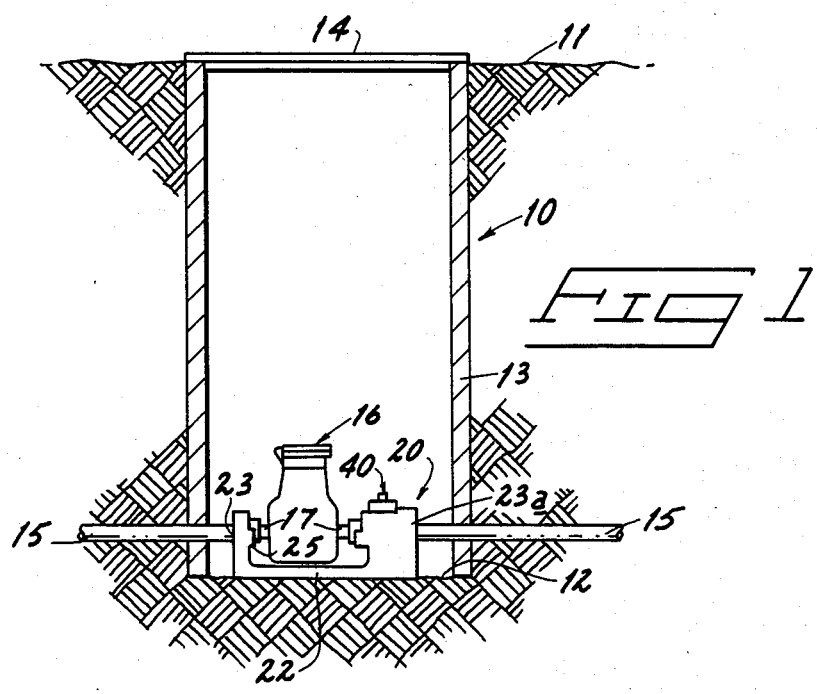
FIG. 1 is an elevational diagrammatic view of the present invention in place within a meter pit and mounting a water meter.

FIG. 1 illustrates a manhole or meter pit 10 which is comprised of a substantially cylindrical excavation extending below the ground surface 11 to a relatively flat pit floor 12. The meter pit 10 may be provided with a liner 13. The liner 13 may be substantially cylindrical and of a minimum diameter due to the installation and removal features afforded by the present invention as will be described below.

The meter pit 10 may be selectively covered by a lid 14, more commonly known as a "manhole" cover. However, the dimensions of the lid 14 when used with the present holder, may be substantially smaller and less conspicuous.

A waterline 15 is interrupted by the meter pit 10. The waterline 15 is typically located below the frost line. A flow control device is shown connected to the water line 15. Because the present holder can be used with a variety of equipment within meter pits, the term "flow control device" is to be taken herein broadly to mean any form of device to be releasably connected to the waterline 15 at the base of a meter pit 10. Since water meters find predominent use in meter pits 10, a typical meter is shown in the drawings at 16 as a representative "device" for purposes in describing the present holder. Other "devices" might be various forms of valving, pressure reliefs, purging or injecting access apparatus, etc.

The present meter holder 20 may be mounted intermediate the meter pipe connectors 17 and waterline 15 in order to releasably secure the meter or other equipment in place and to facilitate installation or removal of the meter 16 from the ground surface 11.

The present holder 20 includes a rigid cradle frame 21. The frame 21 is elongated, having a base extending between ends. The base 22 is provided as a support for the remaining elements of the present holder and to rest against the pit floor 12. The base includes longitudinal legs 22d extending the full length of the frame for resting against the surface of the pit floor 12 (FIG. 3).

Upstanding legs 23, 23a protrude from one side of the base 22 at the opposite ends thereof. The legs 23 and 23a are preferably integral with the base 22 and are substantially perpendicular thereto. When the frame 21 is situated at the pit floor 12, the upstanding legs 23, 23a will project upwardly to the level of the waterline 15.

The upper ends of legs 23, 23a are bored and tapped, forming fittings 24, 24a that threadably receive the ends of the waterline 15. The bores are preferably coaxial along a common axis x—x. There may also be some form of intermediate fitting member between the water pipe and fittings 24, 24a to facilitate placement of the cradle frame 21 within the meter pit 10.

A first saddle member 25 is formed within one of the upstanding legs 23 for releasably receiving one of the pipe connectors 17 of water meter 16. The saddle member 25 may include an upwardly facing notch 26 that is complementary to the meter pipe connectors 17 and coaxial with an open bore 27. The bore 27 is formed through the leg 23 and is coaxial with the fitting 24. Thus, the meter pipe connector 17 may be cradled by the upwardly facing notch 26 in coaxial alignment with the bore 27 and fitting 24. The notch will allow relatively free vertical movement of the pipe connector 17 to facilitate installation and removal of the meter.

A second saddle member 30 is found along the upstanding leg 23a. The second saddle member is mounted to the leg 23a for horizontal sliding translational movement along the axis x—x, between an operative position as shown in FIG. 4 wherein the meter is axially clamped between the saddle members, and an inoperative position (FIG. 5) in which the water meter can be removed vertically.

A bore 31 is formed through the remaining leg 23a that is coaxial along axis x—x with the bore of its water pipe fitting 24a.

Figure 2:
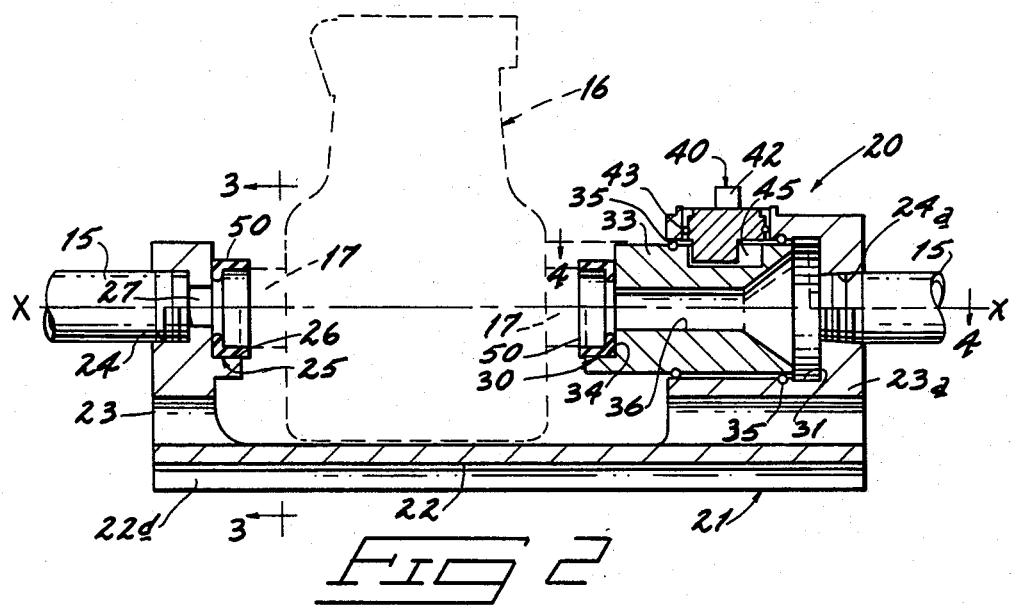
FIG. 2 is an enlarged elevational sectional view of the present holder mounting a water meter, the meter being shown by dotted lines.

The second saddle member 30 includes a movable sleeve 33 that is slidably mounted within the bore 31 of the adjacent leg 23a. A free end of the sleeve 33 includes an upwardly facing notch 34 in which another of the water meter pipe connectors 17 may be cradled. The notch 34 is coaxial with and substantially identical to the previously described notch 26. An internal bore 36 (FIG. 2) is formed through the sleeve 33. The bore 36 opens into the bore 31 and the notch 34.

The notches 26 and 34 are spaced apart to receive the opposite pipe connector ends 17 of the water meter 16. The space, however, can vary due to the translational movement afforded the second saddle member 30. Such movement is allowed to facilitate clamping and release of the meter. "O" ring seals 35 are provided between the sleeve 33 and inside surfaces of the bore 31 to slidably seal the sleeve and bore.

A linkage means is shown generally at 40. The linkage means 40 is situated between the second saddle member 30 and cradle frame 21 for moving the second saddle member 30 between its operative position (FIG. 4) and inoperative position (FIG. 5). The linkage means 40 is specially adapted to be operated from the ground surface 11, thereby eliminating the need for the worker to descend into the meter pit 10 to gain access to remove or install a meter.

The linkage means 40 may include an integral cam 41 and actuator 42 (FIG. 2) that may be turned to produce translational motion of the sleeve 33. The cam 41 and actuator 42 may be rotatably mounted within a journal 43 formed through the associated upstanding leg 23a. The axis of the journal may be upright and perpendicular to the axis x—x to facilitate access by an appropriate tool from above ground location.

The cam 41 may be received within a follower slot 45 formed in the sleeve 33 between the "O" rings 35. The "O" rings therefore effectively seal the cam 41 and follower 45. FIGS. 4 and 5 show an exemplary configuration of the slot 45 and the peripheral shape of the cam 41. Both include complementary abutment surfaces 46 and 47 that limit the amount of angular pivotal motion of the cam to approximately 90 degrees.

The cam follower slot 45 includes an over center shoulder 48 that prevents accidental or unintentional release of the cam from the slot to allow motion in a rearward direction to release the pipe connectors 17. The cam end is complementary to the curvature of the follower slot 45 at this location so the slot and cam end will function similarly to a detent, locking in a substantially over center condition when in the operative condition.

The cam may be rotated by the actuator 42 through a connection to an appropriate form of tool (not shown). The tool may include an elongated shank and operating handle that may be held above the ground surface for operation from above the ground level 11. Rotation of the actuator 42 will cause corresponding rotational motion of the cam 41.

Movement to the inoperative position snaps the cam end from its over center relationship with the over center shoulder 48 and allows the sleeve 33 to slide rearwardly. This releases axial pressure exerted between the pipe connectors 17 and allows vertical removal of the meter from above the meter pit. Conversely, the meter can be selectively clamped between the first and second saddle members by rotation of the actuator and cam in an opposite direction. The cam surfaces press against the over center shoulder 48, causing corresponding linear translational motion of the sleeve 33 to press against the received pipe connector 17, producing an axial clamping effect between the saddle members 25 and 30.

The cam and follower arrangement described above are given as examples of a preferred form of the linkage means 40. Other forms including but not limited to toggle and gear mechanism (not shown) may also be used effectively, so long as they are operable from above the ground surface and the mechanical equivalent of the cam and follower arrangement shown herein.

A pair of gasket sleeves 50 are provided to facilitate a water tight seal between the meter pipe connectors 17 and the saddle members 25 and 30. The gasket sleeves 50 are preferably formed of a flexible material. Each sleeve includes a "O" ring 51 at one end with an integral sleeve 52 extending to one side thereof. The sleeves are adapted to be fitted over the meter pipe connectors 17 to facilitate positioning of the "O" rings 51 in relation to the saddle members 25, 30 and to facilitate removal of the gasket sleeves from the meter pit along with the meter. The sleeves and "O" rings 51 can therefore be easily removed from the meter pipe connectors 17 and replaced from above the meter pit.

The present holder has distinct advantages over other known forms of releasable meter holders. Firstly, the cradle frame 21 is designed to rest with the base legs 22d against the pit floor 12. This allows the ground heat to be absorbed through the cradle and connected elements to minimize freezing potential. Furthermore, since the meter can be installed and removed from the above ground location, there is no need to form the pit to accommodate a worker. Instead, the pit can be made to a diameter substantially equivalent to the overall length dimensions of the cradle frame 21. This not only reduces the cost of excavation but also the cost for individual pit liners 13 which may be produced on a much smaller scale. Other advantages will be seen by those using the meter as well as those who must periodically remove the meter for service or testing. For example, a distinct advantage is gained by use of the gasket sleeves 50. They eliminate the need to descend into the pit to replace worn "O" ring gaskets provided in other forms of meter cradles. The sliding saddle 30 and linkage means 40 are constructed to be reliable and maintenance free. Years of service even in adverse conditions can therefore be reasonably expected.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. A pit holder for releasably mounting a flow control device such as a water meter having opposed coaxial pipe connectors to a waterline at the bottom of an excavated meter pit, the holder comprising;
    a cradle frame including an elongated cradle base adapted to rest against the bottom of a meter pit;
    rigid upstanding legs at opposite ends of the base, having coaxial bores adapted for connection to a water line and for holding the water line stationary to the frame;
    first and second saddle members on the cradle frame legs having coaxial bores formed on a prescribed axis, with each saddle having a pipe connector receiving saddle facing upwardly and adapted to vertically receive and release the pipe connectors;
    the first saddle member being stationary on one of the cradle legs;
    the second saddle member being mounted to the remaining leg of the cradle frame for horizontal sliding translational movement along the prescribed axis independently of the water line between an operative position adapted to axially clamp a flow control device by the saddle members between its pipe connectors, and an inoperative position in which the device can be moved vertically to engage or disengage the pipe connectors thereof with the saddle members;
    linkage means between the second saddle member and cradle frame adapted for operation from above the excavated meter pit for moving the second saddle member between its operative and inoperative positions; and
    wherein the linkage means includes a cam locking means selectively operable to lock the second saddle member in its operative position.

2. The pit holder for releasably mounting a flow control device such as a water meter as claimed by claim 1 wherein the axis of the saddle member bores is substantially parallel with the base of the cradle frame and wherein the saddle members include open notches adapted to cradle the pipe connectors of the device.

3. The pit holder for releasably mounting a flow control device such as a water meter as claimed by claim 1 wherein the cam locking means is comprised of:
    a remotely actuatable cam mounted to the cradle frame for pivotal movement thereon about a cam axis between an over center locked operative position and an inoperative position;
    a cam follower on the second saddle member engaging the cam for moving the second saddle member in response to engagement by the cam and movement of the cam about its axis.

4. The pit holder for releasably mounting a flow control device such as a water meter as claimed by claim 3 wherein the cam is positioned to pivot about a vertical axis within a meter pit by actuation from outside the pit.

5. A holder for releasably mounting a water flow control device having coaxially spaced pipe connectors to a water supply line, the holder comprising:
    a cradle frame including a rigid elongated base and upstanding legs at opposite ends thereof;
    the upstanding legs being stationary on the cradle frame and having connectors for receiving and holding ends of a water supply line stationary in relation to the cradle frame;
    first and second saddle members on the cradle frame legs having coaxial bores formed on a prescribed axis and open to the connectors on the frame legs, the saddles each having one side thereof including a pipe connector receiving saddle facing away from the base and adapted to transversely receive and release the pipe connectors of a flow control device with respect to the prescribed axis;
    the first saddle member being stationary on one of the cradle legs;
    the second saddle member being mounted to the remaining leg of the cradle frame for sliding translational movement relative to the cradle frame and in open communication with the stationary connector along the prescribed axis;
    the translational movement of the second saddle member being between an operative position adapted to axially grip a flow control device between the saddle members and an inoperative position wherein the flow control device can be moved transversely with respect to the prescribed axis, into and away from the saddle members; and
    linkage means between the second saddle member and cradle frame manually operable from a remote location to slide the second saddle member translationally between the operative and inoperative positions and to selectively lock the second saddle member in the operative position.

6. The holder as claimed by claim 5 wherein the linkage means is comprised of:
    a remotely actuatable cam mounted to the cradle frame for pivotal movement thereon about a cam axis between an operative over center locking position and an inoperative position; and
    a cam follower on the second saddle member engaging the cam for moving the second saddle member in response to engagement by the cam and movement of the cam about its axis.

7. The holder as claimed by claim 6 wherein the cam axis is substantially perpendicular to the prescribed axis of the saddle member bores.

8. A pit mounted flow monitoring assembly for connection to a fluid flow line, comprising:
    a flow control device having opposed pipe connectors for connection to a fluid flow line at the bottom of an excavated meter pit;
    a cradle frame including an elongated cradle base adapted to rest against the bottom of a meter pit;
    upstanding legs at opposite ends of the base, having bores adapted for connection to a fluid flow line;
    first and second saddle members on the cradle frame legs formed on a prescribed axis, with each saddle having a pipe connector receiving saddle facing upwardly and for releasably mounting the flow control device pipe connectors;
    gasket sleeves removably received over the flow control device pipe connectors and having seal surfaces removably receivable within the saddle members;

the first saddle member being stationary on one of the cradle legs;

the second saddle member being mounted to the remaining leg of the cradle frame for horizontal sliding translational movement independently of the fluid flow line along the prescribed axis between an operative position to axially clamp the flow control device by the saddle members between its pipe connectors, and an inoperative position in which the device can be removed from the saddle members; and linkage means between the second saddle member and cradle frame adapted for operation from above the excavated meter pit for moving the second saddle member between its operative and inoperative positions, and for selectively locking the second saddle member in the operative position.

9. The pit holder for releasably mounting a flow control device such as a water meter as claimed by claim 8 wherein the gasket sleeves are each comprised of a pliable "O" ring with an integral, coaxial sleeve projecting to one side thereof to be fitted over the pipe connectors of the flow control device.

10. The pit holder for releasably mounting a flow control device such as a water meter as claimed by claim 8 wherein the cam locking means is comprised of:

a remotely actuatable cam mounted to the cradle frame for pivotal movement thereon about a cam axis between an over center locked operative position and an inoperative position;

a cam follower on the second saddle member engaging the cam for moving the second saddle member in response to engagement by the cam and movement of the cam about its axis.

* * * * *